United States Patent
Mullican et al.

(10) Patent No.: US 7,681,898 B2
(45) Date of Patent: Mar. 23, 2010

(54) COMPOSITE SUSPENSION SYSTEM FOR A VEHICLE

(75) Inventors: Vernon Jeffrey Mullican, Visalia, CA (US); Vernon T. Mullican, Visalia, CA (US)

(73) Assignee: TLC Suspensions, LLC, Los Angeles, CA (US)

( * ) Notice: Subject to any disclaimer, the term of this patent is extended or adjusted under 35 U.S.C. 154(b) by 0 days.

(21) Appl. No.: 12/407,723

(22) Filed: Mar. 19, 2009

(65) Prior Publication Data
US 2009/0179398 A1     Jul. 16, 2009

Related U.S. Application Data

(63) Continuation-in-part of application No. 11/281,606, filed on Nov. 18, 2005.

(60) Provisional application No. 61/070,375, filed on Mar. 20, 2008, provisional application No. 61/143,254, filed on Jan. 8, 2009, provisional application No. 61/150,867, filed on Feb. 9, 2009, provisional application No. 61/153,091, filed on Feb. 17, 2009.

(51) Int. Cl.
*B60G 15/06* (2006.01)
*B60G 11/32* (2006.01)

(52) U.S. Cl. ............................ 280/124.162; 280/5.514; 280/6.159; 280/124.16

(58) Field of Classification Search .............. 267/64.12, 267/195, 217, 218, 221, 227, 259, 31, 34; 280/5.514, 6.153, 6.157, 6.159, 124.16, 124.162, 280/124.163, 124.165, 124.168, 124.17, 280/124.179
See application file for complete search history.

(56) References Cited

U.S. PATENT DOCUMENTS

| | | | | |
|---|---|---|---|---|
| 1,502,209 A | * | 7/1924 | Peterson | ................ 188/321.11 |
| 1,961,634 A | | 6/1934 | Faunton | |
| 2,023,135 A | | 12/1935 | Hawkins | |
| 2,030,263 A | | 2/1936 | Mercer, Jr. | |
| 2,042,596 A | * | 6/1936 | Gouirand | ............. 280/124.161 |
| 2,145,891 A | | 2/1939 | Rice, Jr. | |
| 2,441,629 A | | 5/1948 | Hahn | |
| 2,711,315 A | | 6/1955 | Mosebach | |

(Continued)

*Primary Examiner*—Paul N Dickson
*Assistant Examiner*—Laura Freedman
(74) *Attorney, Agent, or Firm*—Kelly Lowry & Kelley, LLP

(57) ABSTRACT

A composite suspension system for a vehicle includes a mechanical suspension system supporting the body of the vehicle with respect to an axle and a pneumatic suspension system to selectively provide support for the body relative to the axle. Under heavy loads, the pneumatic suspension system may be inflated to support the body relative to the axle. When not under heavy loads the pneumatic suspension system may be deflated so as not to interfere with the support provided by the mechanical suspension system. A control system regulates a compressor connected to the pneumatic suspension system to inflate the same. The control system also regulates access of the pneumatic suspension system to a vacuum source to deflate the same.

27 Claims, 8 Drawing Sheets

U.S. PATENT DOCUMENTS

| | | | |
|---|---|---|---|
| 2,715,023 A | | 8/1955 | Nallinger |
| 2,807,475 A | * | 9/1957 | Post ........................ 280/5.508 |
| 2,933,104 A | * | 4/1960 | Jackson ................. 137/596.18 |
| 2,969,990 A | * | 1/1961 | Szostak ................... 280/6.157 |
| 2,971,772 A | * | 2/1961 | Tantlinger et al. ........ 280/86.75 |
| 2,989,301 A | | 6/1961 | Johannsen |
| 3,001,783 A | * | 9/1961 | Moody ........................ 267/34 |
| 3,003,575 A | * | 10/1961 | Nallinger .................... 180/358 |
| 3,031,179 A | * | 4/1962 | Peirce ......................... 267/31 |
| 3,031,204 A | * | 4/1962 | De Lorean ............... 280/6.159 |
| 3,033,554 A | * | 5/1962 | Francis ........................ 267/34 |
| 3,054,624 A | | 9/1962 | Nallinger |
| 3,063,732 A | * | 11/1962 | Harbers et al. ............. 280/6.16 |
| 3,116,918 A | * | 1/1964 | Francis .................... 267/64.14 |
| 3,178,167 A | | 4/1965 | Loewis |
| 3,215,339 A | * | 11/1965 | Jackson ................. 137/565.37 |
| 3,237,957 A | * | 3/1966 | Harbers ................... 280/6.159 |
| 3,257,122 A | * | 6/1966 | Vogel ...................... 280/5.508 |
| 3,287,025 A | | 11/1966 | Garcea |
| 3,342,141 A | * | 9/1967 | Browne ................... 105/215.2 |
| 3,390,895 A | * | 7/1968 | Verdi ........................ 280/86.5 |
| 3,448,975 A | * | 6/1969 | Verdi ........................... 267/31 |
| 3,480,293 A | * | 11/1969 | Palmer et al. ................. 180/41 |
| 3,552,767 A | | 1/1971 | Yew et al. |
| 3,572,676 A | | 3/1971 | Yew |
| 3,598,422 A | | 8/1971 | Strauff |
| 3,599,954 A | * | 8/1971 | Yew ............................. 267/44 |
| 3,632,130 A | | 1/1972 | Novotny |
| 3,664,681 A | * | 5/1972 | Thaxton ................ 80/124.116 |
| 3,690,689 A | | 9/1972 | Fannin et al. |
| 3,727,899 A | | 4/1973 | Pemberton |
| 3,751,066 A | * | 8/1973 | Narahari .................... 280/86.5 |
| 3,754,768 A | | 8/1973 | Ellis et al. |
| 3,768,820 A | * | 10/1973 | Yew ........................ 280/6.159 |
| 3,784,221 A | * | 1/1974 | Frasier, Sr. ................. 280/86.5 |
| 3,810,650 A | | 5/1974 | Hudson |
| 3,850,445 A | * | 11/1974 | Borns et al. ........... 280/124.163 |
| 3,966,223 A | | 6/1976 | Carr |
| 4,099,741 A | * | 7/1978 | Sweet et al. .......... 280/124.163 |
| 4,580,809 A | * | 4/1986 | Leaf .................... 280/124.106 |
| 4,687,224 A | | 8/1987 | Selzer |
| 4,736,931 A | | 4/1988 | Christopherson |
| 4,783,089 A | | 11/1988 | Hamilton et al. |
| 4,830,395 A | | 5/1989 | Foley |
| 4,909,535 A | | 3/1990 | Clark et al. |
| 5,058,917 A | * | 10/1991 | Richardson ................ 280/86.5 |
| 5,346,246 A | | 9/1994 | Lander et al. |
| 5,401,053 A | | 3/1995 | Sahm et al. |
| 7,500,688 B2 | * | 3/2009 | Mullican et al. ...... 280/124.175 |
| 2005/0236792 A1 | * | 10/2005 | Hedenberg ............ 280/124.11 |
| 2006/0103102 A1 | | 5/2006 | Mullican |
| 2006/0175789 A1 | * | 8/2006 | Mullican et al. ...... 280/124.163 |

* cited by examiner

COMPOSITE SUSPENSION SYSTEM FOR A VEHICLE

BACKGROUND OF THE INVENTION

This invention relates to suspension systems for vehicles. As used herein, the terms "vehicle" and "vehicles" are intended to include but not be limited to passenger cars, sport utility vehicles, pick-up trucks, commercial trucks, buses, vans, recreational vehicles, motor homes, farm equipment, and non-motorized trailers that carry horses, boats, cars and other loads.

Since the advent of vehicles, numerous suspension systems have been devised to improve the ride of the vehicle not only for the comfort of the occupants but also for maintaining the structural integrity and aesthetics of the contents by providing sufficient lift capability, vehicle stability, and improved handling. For example, motorized vehicles in use since the early 1900s have used simple leaf spring rear suspension systems as have certain non-motorized vehicles such as trailers. Indeed, a substantial number of modern vehicles including, but not limited to pick-up trucks, vans, sport utility vehicles, commercial trucks, and trailers continue to use simple leaf spring rear suspension systems. Some vehicles also use coil spring suspensions.

In addition to simple leaf spring or coil spring rear suspension systems, air springs have long been used in various suspension systems in a variety of vehicle types. In known suspension systems employing air springs, the air springs are firmly attached to supporting members of the vehicle at the top and bottom portions of the air springs. These systems typically require very high air pressure which causes the air springs, and hence the ride on an air suspension, to be stiff. While systems employing air springs provide additional advantage for carrying or towing heavy loads, the ride is generally stiffer. Thus, air spring suspension systems provide lift when heavily loaded but at the expense of the comfort of the occupants which may not be justified during operation of the vehicle without heavy loads.

Various aftermarket devices have been developed to provide increased lift capability and stability of a vehicle when carrying heavy loads. Generally, suspension systems strong enough to provide sufficient lift when loaded are always on and make the ride stiffer during unloaded operation. Suspension systems that don't interfere with unloaded operation may not be strong enough to provide sufficient lift when loaded. Additionally, there is often insufficient space in most vehicles for more than one suspension system. While some systems are quite simple and easily added to existing vehicles, others require significant modifications to the standard "original equipment manufacturer" (OEM) product and/or require complicated installation.

Accordingly, it is an object of the present invention to improve the ride and load-carrying capabilities of existing vehicles with an easy-to-install retrofit suspension system that does not interfere with the factory installed suspension system of the vehicle. The same system can also be integrated into new vehicles to improve ride, handling, and load-carrying capabilities. Another object of the invention is to provide an "on demand" and/or "standby" suspension system that a vehicle operator can engage and disengage as required.

The present invention fulfills these needs and provides other related advantages.

SUMMARY OF THE INVENTION

The present invention is directed to a composite suspension system for a vehicle comprising a mechanical suspension system and a pneumatic suspension system. The mechanical suspension system connects a body of the vehicle to an axle. The pneumatic suspension system is movable between inflated and deflated positions. In the inflated position, the pneumatic suspension system supports the body of the vehicle relative to the axle. In the deflated position, the pneumatic suspension system does not support the body relative to the axle.

The mechanical suspension system comprises a leaf spring suspension, a coil spring suspension or a shock absorber. The pneumatic suspension system preferably comprises an air spring suspension that is supported by the body or adjacent to the axle. The composite suspension system may further comprise a support bracket mounted adjacent to the axle and a predetermined distance below the body when the body is mounted on the mechanical suspension system. Support rings, bars, or other structure may be included on either the upper side of the support bracket or the underside of the body for receiving the pneumatic suspension system when in the inflated position.

The composite suspension system further comprises a control system for inflating or deflating the pneumatic suspension system. The control system preferably comprises an air line attached to the pneumatic suspension system, a first hose connecting the air line to an air compressor, and a second hose connecting the air line to a vacuum source having a valve therebetween.

The composite suspension system may further comprise a control panel for controlling the compressor and valve. The control panel is preferably mounted in a passenger compartment on the vehicle. Using the control system, the pneumatic suspension system is inflated by activating the air compressor until optimum pressure and body height are achieved, and closing the valve. Conversely, the pneumatic suspension system is deflated by opening the valve. A vacuum or negative pressure source, usually provided by a vehicle engine, is introduced to the control system in order to retract the pneumatic suspension system or air springs to their minimum height. This allows for maximum clearance when the pneumatic suspension system is in its "stand-by" position.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

The present invention is directed to a composite suspension system for a vehicle that provides improved ride and load carrying capabilities over existing suspension systems. More particularly, as generally illustrated in FIGS. 1-17, the present invention is directed to a composite suspension system comprising a mechanical suspension system and a pneumatic suspension system, wherein the pneumatic suspension system may be selectively engaged or disengaged.

Figure 1:
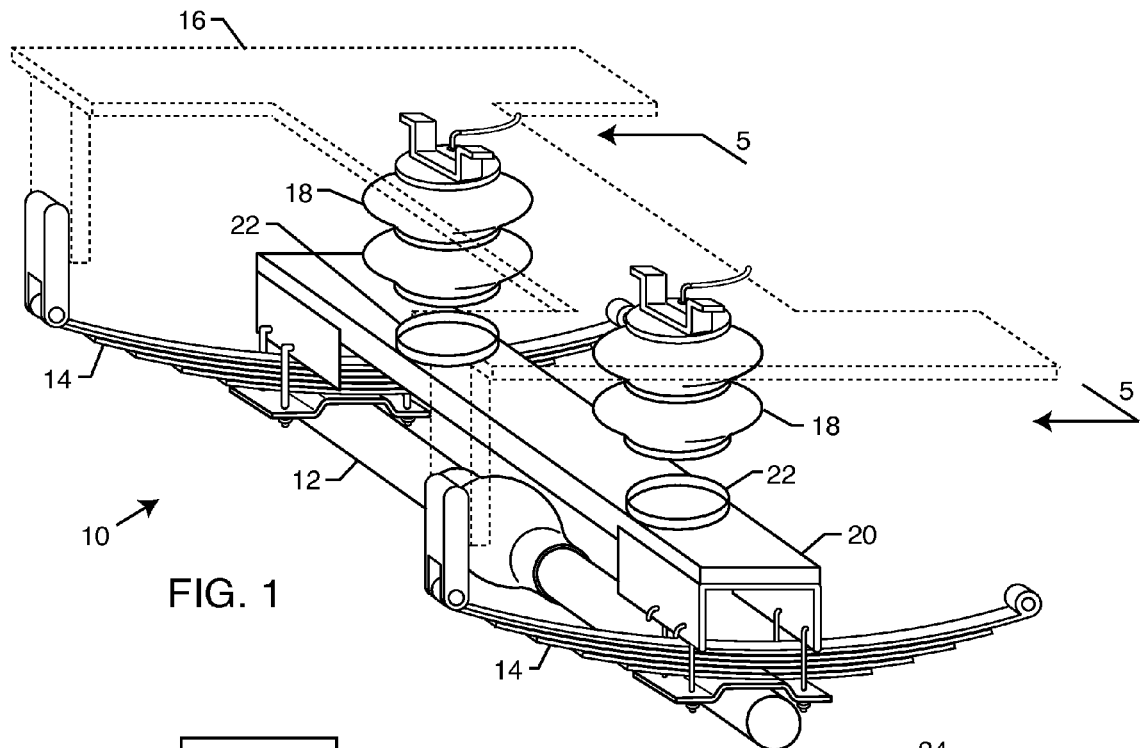
FIG. 1 is an elevated perspective view of a preferred embodiment of the composite suspension system according to the present invention.

FIG. 1 illustrates a preferred embodiment of the composite suspension system 10 of the present invention. In this embodiment an axle 12 is illustrated with a mechanical suspension system 14, which in this case is a leaf spring suspension. The mechanical suspension system 14 is secured to the axle 12 by any conventional method used today. The mechanical suspension system 14 is secured at its ends to a frame/body 16 of a vehicle. In this way, the mechanical suspension system 14 provides support for the frame/body 16 in a conventional manner.

The composite suspension system 10 also includes a pneumatic suspension system 18, which in this case comprises air springs. The air springs 18 may be mounted to the underside of the frame/body 16 as illustrated in FIGS. 1 and 3-6. Alternatively, the air springs 18 may be mounted on an upper surface of a support bracket 20 which is itself mounted on top of the axle 12. FIG. 1 illustrates the support bracket 20 mounted so as to clamp onto or around the leaf spring 14. The support bracket 20 may be mounted in any manner provided that it is fixed and immovable with respect to the axle 12. An example of such mounting is described in U.S. Pat. No. 7,500,688, which is incorporated herein by this reference. It may be undesirable to mount the support bracket 20 directly on the axle 12. In such instance adaptor plates (not shown) may be necessary. In addition, it may be necessary to modify the shape of the support bracket 20, i.e., include an offset, so that the support bracket 20 accommodates existing structures on the vehicle, such as the universal joint on the axle 12. Such modifications are within the ordinary skill of the art.

Figure 3:
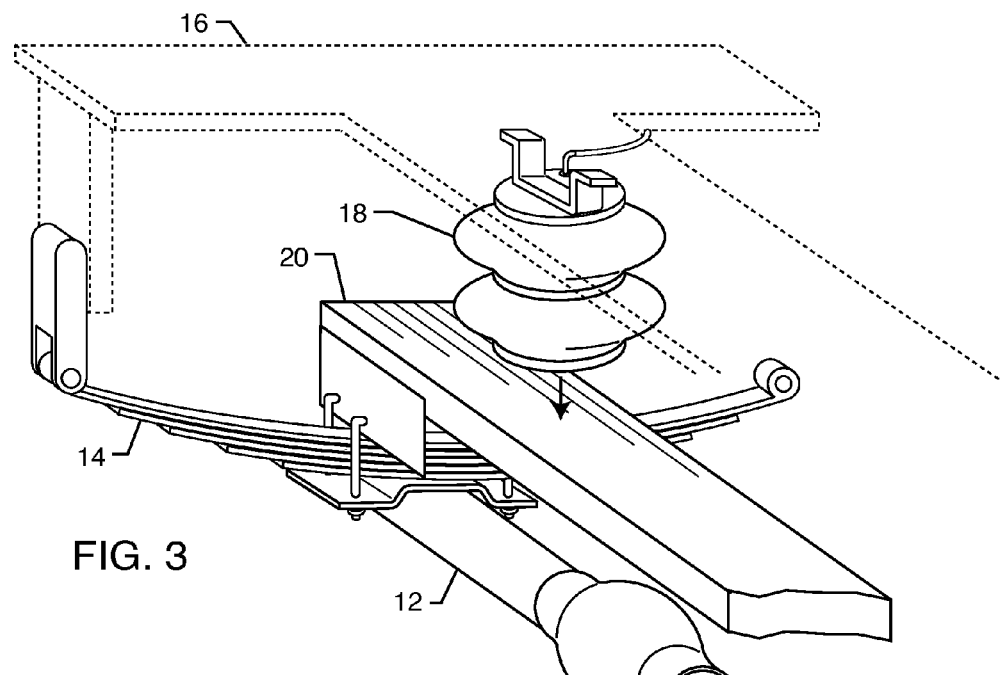
FIG. 3 is a close-up perspective view of an air spring suspension in a preferred embodiment of the composite suspension system according to the present invention, the air spring suspension being in a deflated position.
Figure 4:
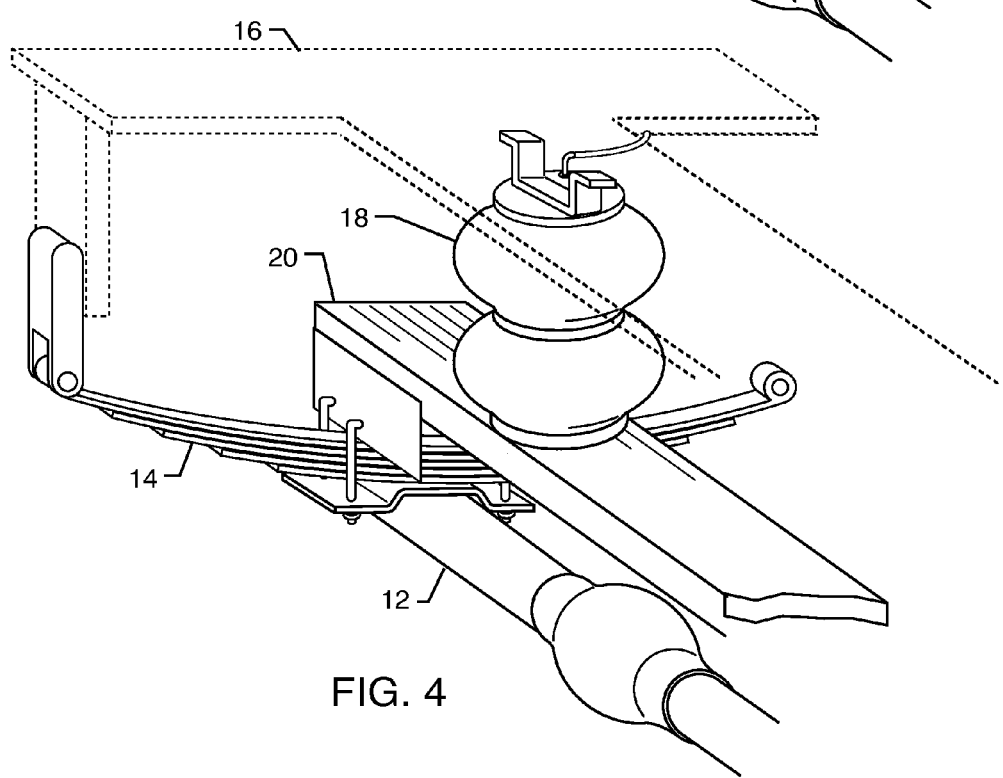
FIG. 4 is a close-up perspective view of an air spring suspension in a preferred embodiment of the composite suspension system according to the present invention, the air spring suspension being in an inflated position.
Figure 5:
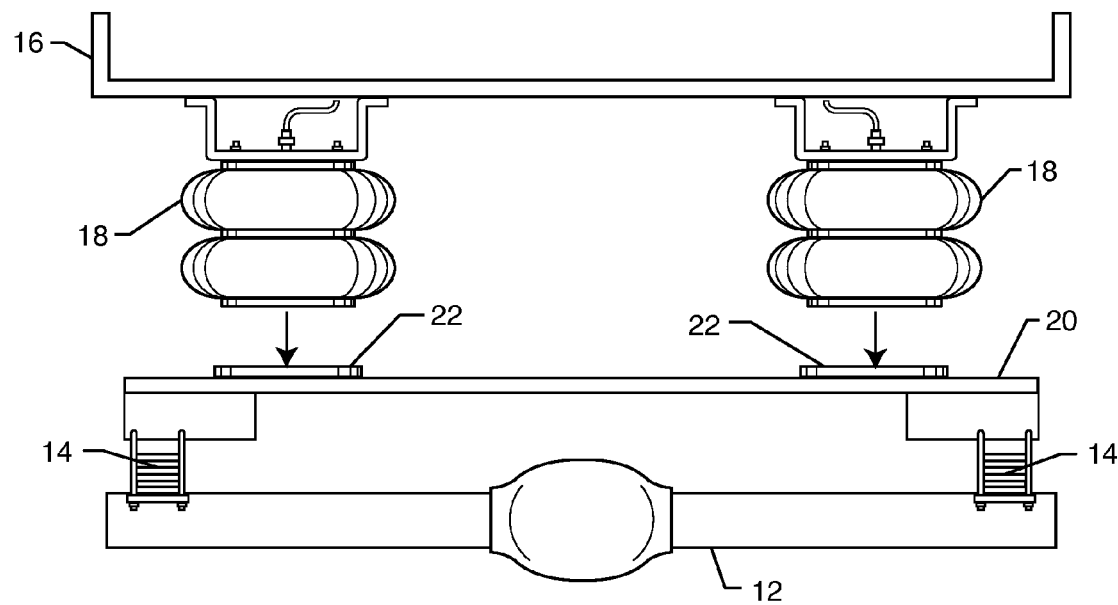
FIG. 5 is a rear view of an air spring suspension in a preferred embodiment of the composite suspension system according to the present invention, the air spring suspension being in a deflated position.
Figure 6:
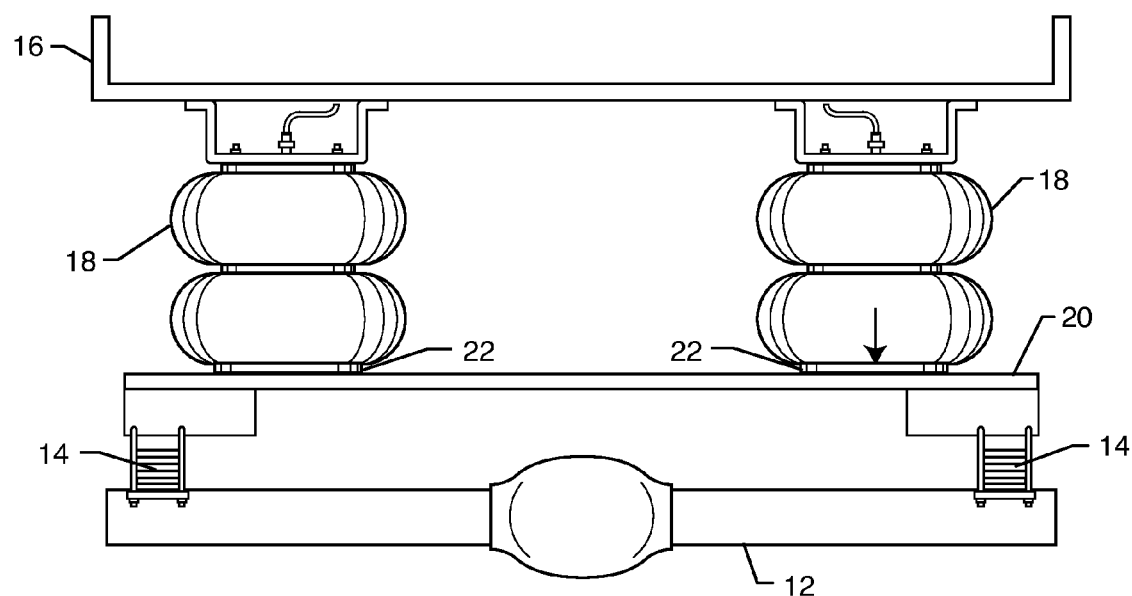
FIG. 6 is a rear view of an air spring suspension in a preferred embodiment of the composite suspension system according to the present invention, the air spring suspension being in an inflated position.
Figure 7:
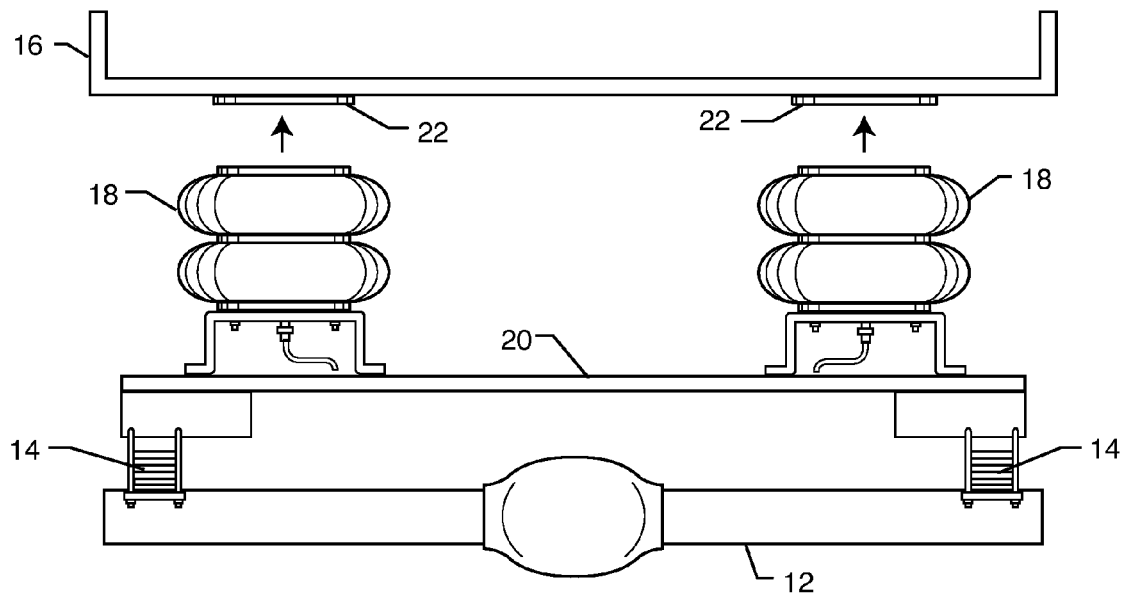
FIG. 7 is a rear view of an alternative embodiment of the composite suspension system according to the present invention, the air spring suspension being in a deflated position.
Figure 8:
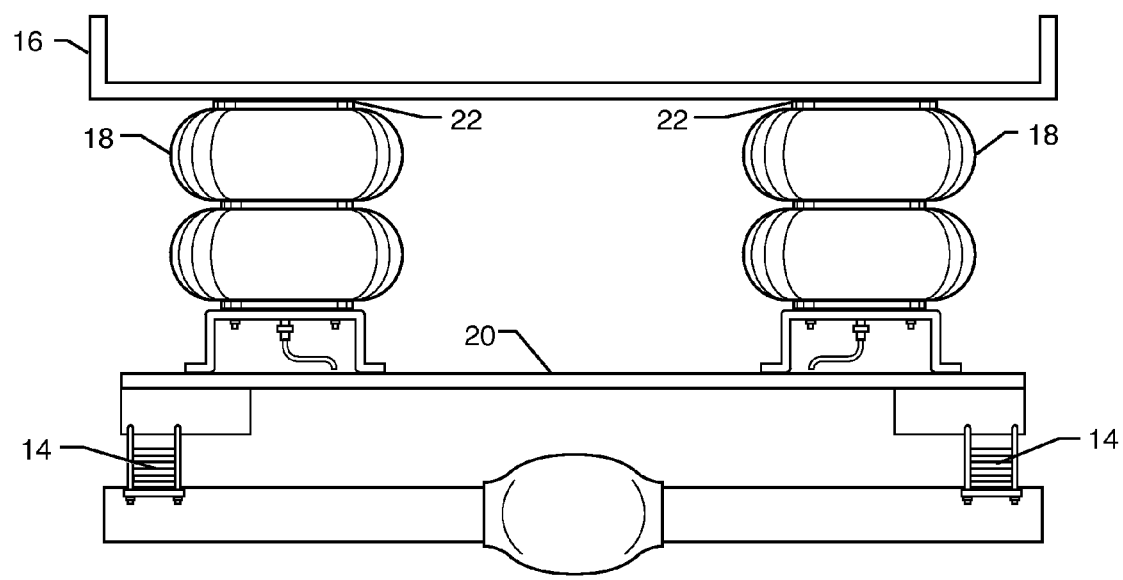
FIG. 8 is a rear view of an alternate embodiment of the composite suspension system according to the present invention, the air spring suspension being in an inflated position.

FIGS. 1, 5 and 6 illustrate support rings 22 on the support bracket 20. The support rings 22 are to receive an end of the air springs 18 when in an inflated position as described further below. The support rings 22 may also be mounted on the underside of the frame/body 16 in those instances wherein the air springs 18 are mounted on the support bracket 20 and expand upward towards the frame/body 16 when inflated. The support rings 22 are optional features to increase the stability of the air springs 18 with respect to the support bracket 20 or frame/body 16. The support rings 22 may be eliminated entirely from either the support bracket 20 or the underside of the frame/body 16 as illustrated in FIGS. 3 and 4.

The air springs 18 are movable between inflated and deflated positions. FIGS. 1, 3, 5 and 7 illustrate the air springs 18 in a deflated or stand-by position. When the air springs 18 are deflated they do not support the frame/body 16 relative to the axle 12. In other words, the air springs 18 do not make contact with both the frame/body 16 and the support bracket 20. Thus, when deflated the air springs 18 do not provide support for the body 16, relying solely on the leaf springs 14.

When the air springs 18 are inflated they support the frame/body 16 relative to the axle 12. The air springs 18 are of sufficient size to make contact with both the frame/body 16 and the support bracket 20 when in an inflated position. In this way, the air springs 18 provide support to the frame/body 16 in addition to that support provided by the leaf springs 14. The additional support provided by the air springs 18 is particularly useful where the vehicle is carrying heavy loads which would be too much for a leaf spring suspension 14 on its own.

Figure 2:
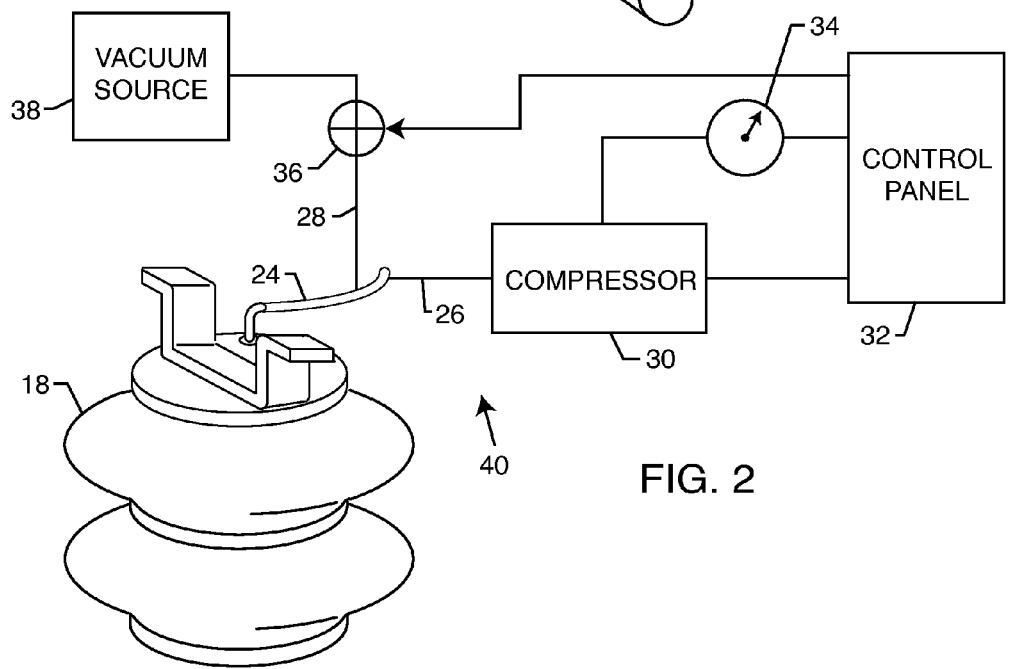
FIG. 2 is a schematic diagram illustrating the configuration of the control system of an air spring suspension.

FIG. 2 illustrates a control system regulating the inflation or deflation of the pneumatic suspension system 18. An air spring 18 is shown with an air line 24 attached thereto. A first hose 26 and second hose 28 are schematically illustrated as being attached to the air line 24. The first hose 26 runs from the air line 24 to a compressor 30. The compressor 30 provides the air that is used to inflate the air springs 18. The compressor 30 is in turn connected to a control panel 32 which may be mounted in a passenger compartment on the vehicle or on an exterior surface of the vehicle. The control panel 32 regulates operation of the compressor 30 depending on whether the air springs 18 are to be inflated or deflated. A pressure gage 34 is included with the control panel 32 so that a user can regulate the air pressure in the air springs 18.

The second hose 28 runs from the air line 24 to a valve 36 which is in turn connected to a vacuum or negative pressure source 38. The valve 36 is operationally connected to the control panel 32. In this way, the control panel 32 can regulate when the valve 36 is opened and closed. The control panel 32 may also be operationally connected to the vacuum source so as to control when the vacuum source 38 is permitted to draw air from the system to deflate the air springs.

To inflate the air springs 18 the control panel 32 turns on the compressor 30 which pumps air through the first hose 26 and the air line 24 into the air spring 18. Simultaneously, the control panel closes the valve 36 to block the flow of air from the air line 24 to the second hose 28 which is connected to the vacuum or negative pressure source 38. In this configuration, the compressor 30 pumps air into the air springs 18 until they are inflated to a desired pressure and vehicle body height are achieved, and then the control panel 32 turns off the compressor 30. The air springs 18 are deflated by opening the valve 36, which places the air springs in fluid communication with the vacuum or negative pressure source 38. The vacuum or negative pressure source 38 draws air out of the air springs 18 through the open valve 36, second hose 28 and air line 24, to retract the air springs 18 to their minimum height. This allows for maximum clearance when the pneumatic suspension system is in its "stand-by" position. The vacuum or negative pressure source 38 may include an existing vacuum source on a vehicle, such as an engine vacuum source. Alternatively, the vacuum source may come from an additional component installed on the vehicle specifically designed to generate negative pressure to draw the air out of the air springs 18. The air line 24, first hose 26, second hose 28, air compressor 30, valve 36 and vacuum source 38 comprise a control system 40 for the pneumatic suspension system 18.

Figure 9:
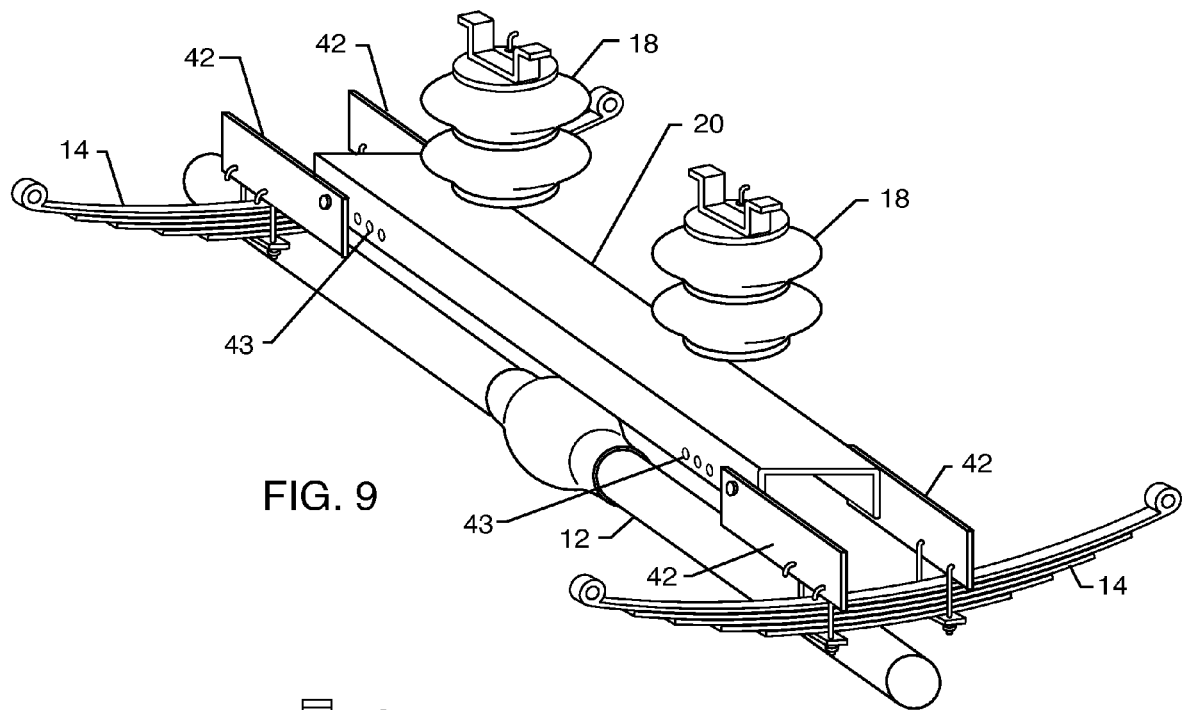
FIG. 9 is an elevated perspective view of another alternate embodiment of the composite suspension system according to the present invention.
Figure 10:
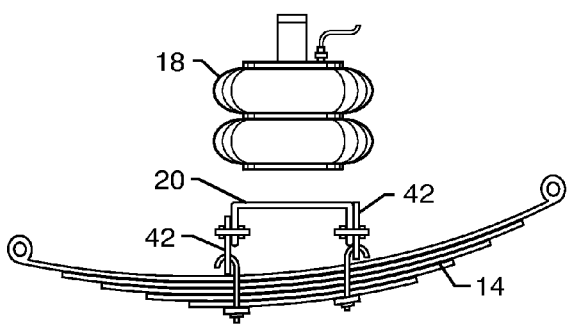
FIG. 10 is a side view of another alternate embodiment of the composite suspension system according to the present invention, the air spring suspension being in a deflated position.
Figure 11:
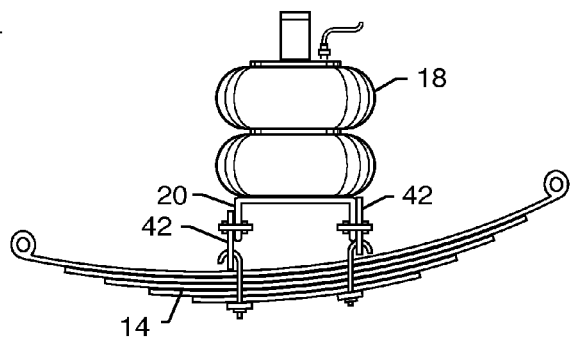
FIG. 11 is a side view of another alternate embodiment of the composite suspension system according to the present invention, the air spring suspension being in an inflated position.

FIGS. 9, 10 and 11 illustrate an alternate embodiment of the composite suspension system 10 of the present invention. The difference in this embodiment from the previous preferred embodiment resides in the support bracket 20 and how the same is connected to the axle 12 or mechanical suspension system 14. In this embodiment, the support bracket 20 does not span across the axle from one mechanical suspension system 14 to the companion mechanical suspension system 14 on the other end of the axle 12. Offset brackets 42 allow the support bracket 20 to be mounted in an essentially horizontal position when the mechanical suspension system 14 is oriented at an angle as illustrated in FIGS. 9, 10 and 11. As seen in these figures, the offset bracket 42 is mounted higher on one side of the support bracket 20 than on the other side. The support bracket 20 may include adjustment holes 43 to provide different points of attachment for the offset brackets 42. This configuration assures that an essentially horizontal surface is provided on the top of the support bracket 20 for either receiving the air springs 18 when inflated as shown in FIG. 11 or for having the air springs 18 mounted thereupon as illustrated in other figures. The essentially horizontal surface assures greater stability and support provided by the pneumatic suspension system 18 when it is in use.

FIGS. 12-15 illustrate additional alternate embodiments of the composite suspension system 10 of the present invention. The most notable difference is the configuration of the mechanical suspension system 14. In these figures the mechanical suspension system 14 is illustrated as coil springs and/or shock absorbers. Coil springs such as these have been used in prior art suspension systems for quite some time.

Figure 12:
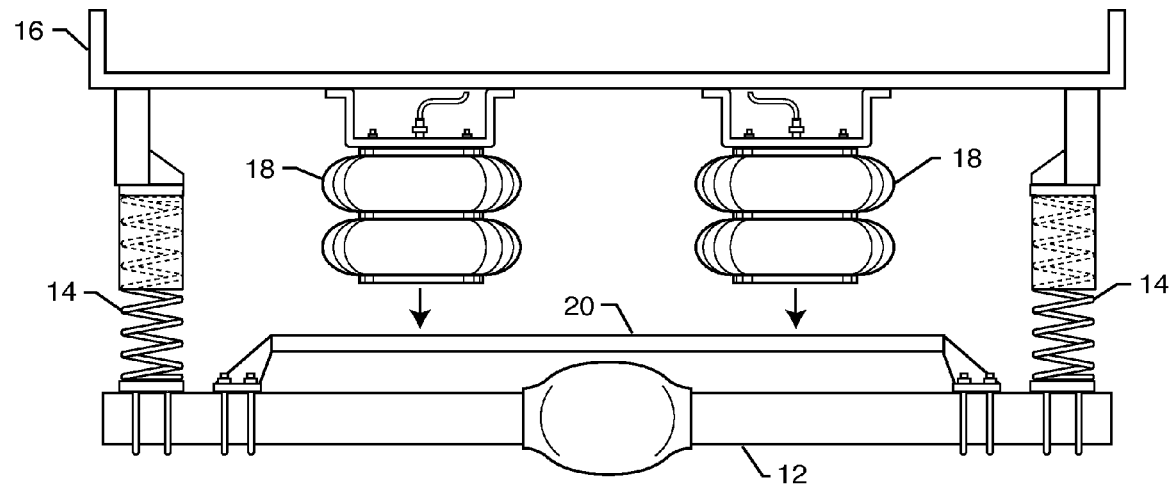
FIG. 12 is a rear view illustrating yet another alternate embodiment of the composite suspension system according to the present invention, the air spring suspension being in a deflated position.
Figure 13:
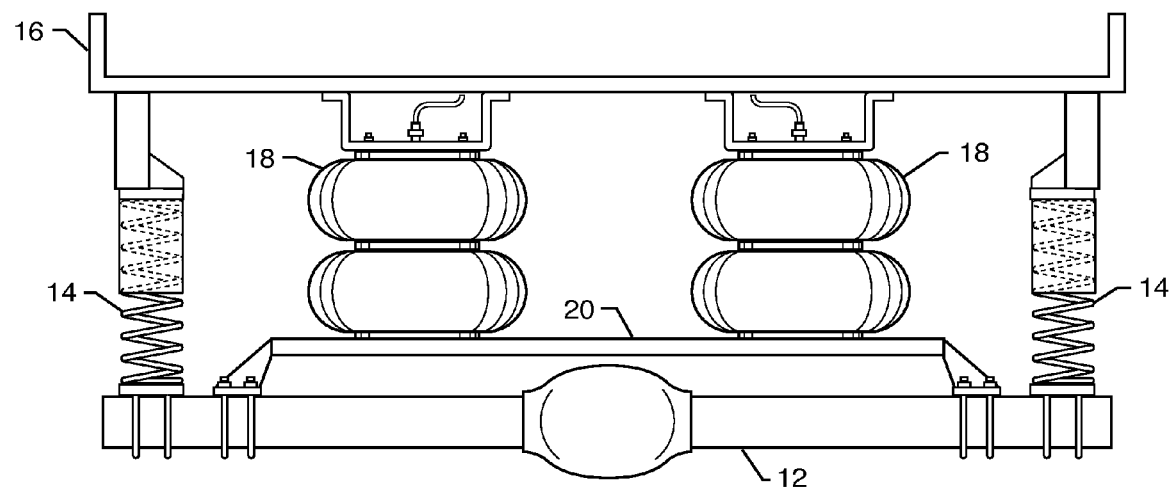
FIG. 13 is a rear view of yet another alternate embodiment of the composite suspension system according to the present invention, the air spring suspension being in an inflated position.
Figure 14:
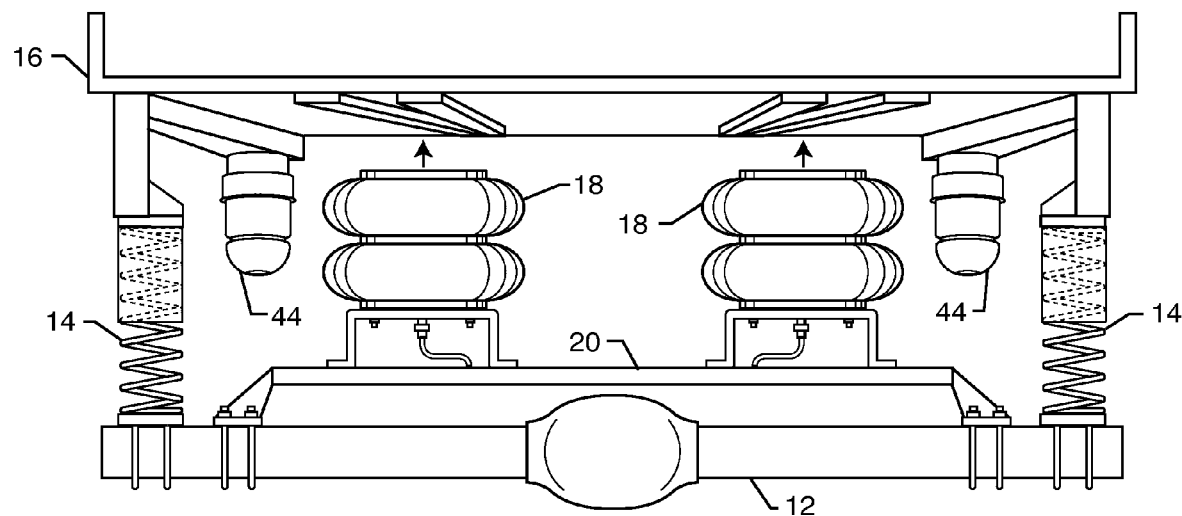
FIG. 14 is a rear view illustrating yet another alternate embodiment of the composite suspension system according to the present invention, the air spring suspension being in a deflated position.

Another difference resides in the configuration of the support bracket 20. Considering how the coil springs 14 are attached to the axle 12 it is necessary to attach the support bracket 20 to the axle 12 at a point closer to the center of the axle than was permitted with the use of leaf springs. Otherwise, the configuration of the support bracket 20 is essentially the same as in the previous embodiments. As seen in FIGS. 12 and 14, the pneumatic suspension system or air springs 18 may be mounted on either the underside of the frame/body 16 or the upper side of the support bracket 20. In either case, when the air springs 18 are inflated they make contact with both the frame/body 16 and the support bracket 20 as illustrated in FIGS. 13 and 15.

Figure 15:
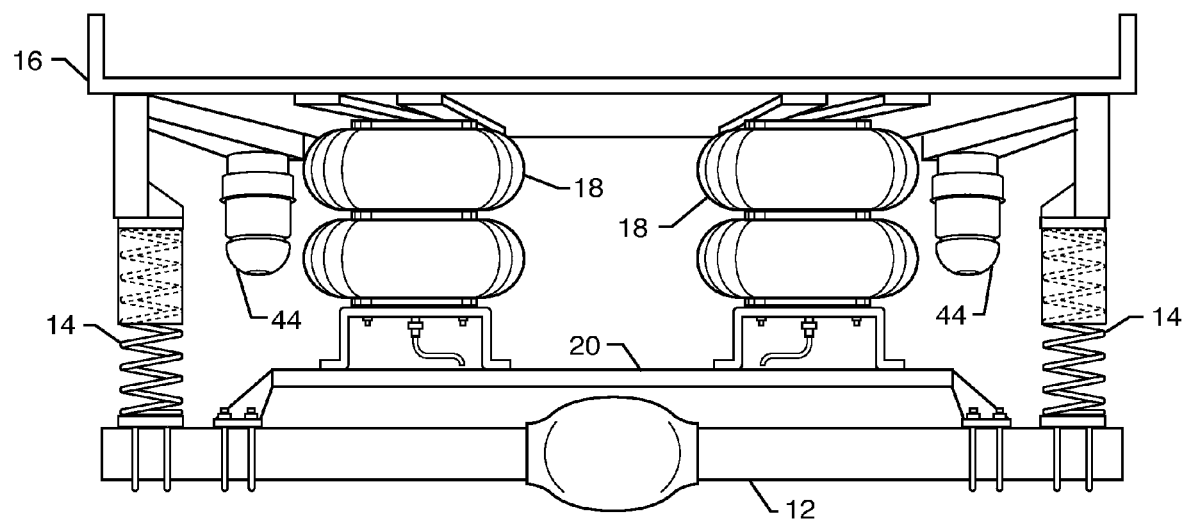
FIG. 15 is a rear view of yet another alternate embodiment of the composite suspension system according to the present invention, the air spring suspension being in an inflated position.

FIGS. 14 and 15 illustrate yet another variation on the composite suspension system 10 of the present invention. A rubber pad 44 may be included to provide additional support for the composite suspension system 10. This rubber pad 44 is configured such that the coil springs 14 are not fully compressed by a heavy load being placed on the vehicle frame/body 16 prior to inflation of the air springs 18. The rubber pads 44 may contact the support bracket 20 or another surface under the frame/body 16 when under heavy loading. The rubber pads 44 are not critical to the operation of the composite suspension system 10 and may be omitted.

Figure 16:
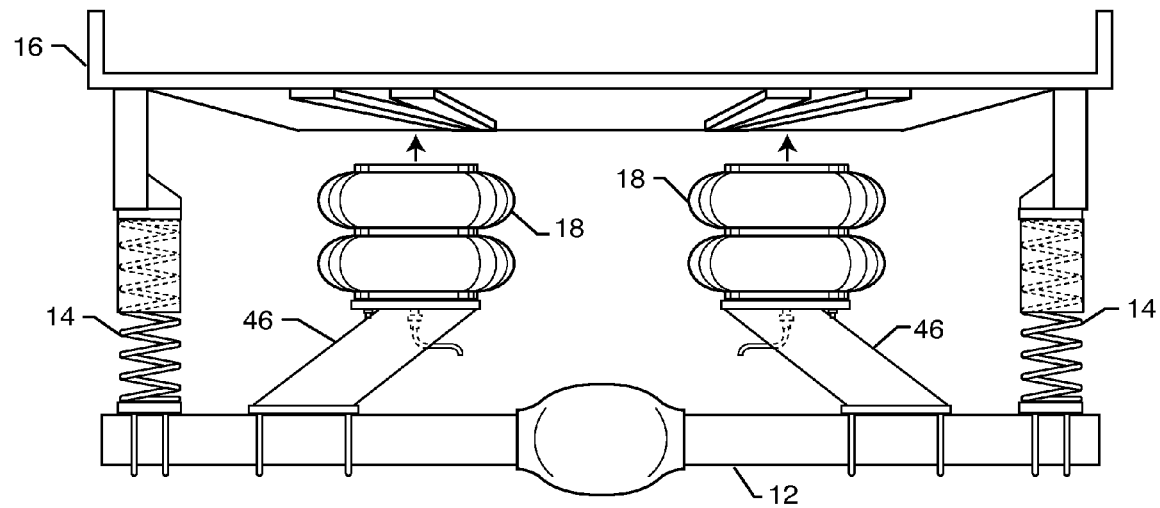
FIG. 16 is a rear view illustrating yet another alternate embodiment of the composite suspension system according to the present invention, the air spring suspension being in a deflated position.
Figure 17:
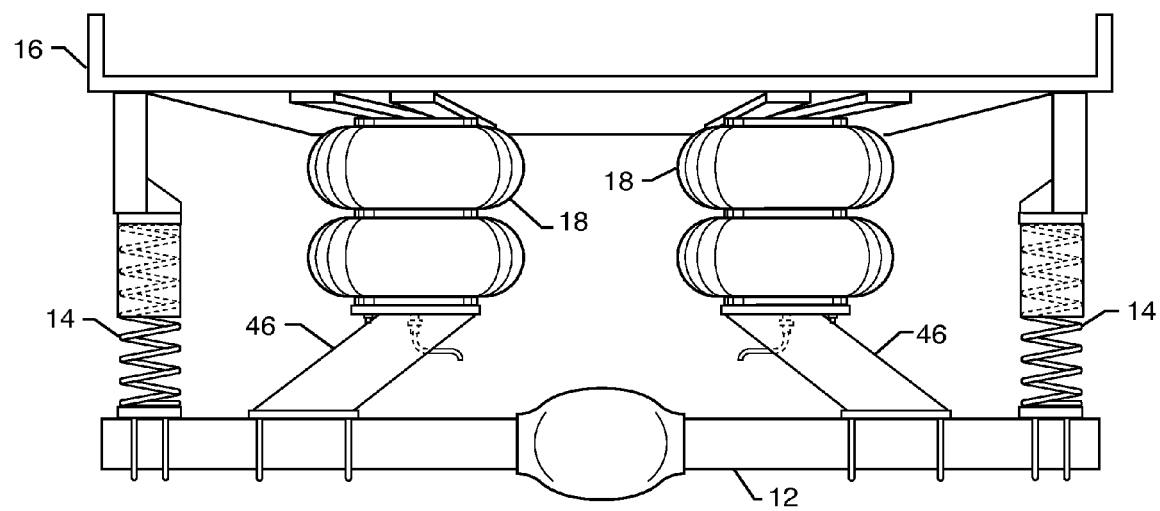
FIG. 17 is a rear view of yet another alternate embodiment of the composite suspension system according to the present invention, the air spring suspension being in an inflated position.

FIGS. 16 and 17 illustrate yet another variation on the composite suspension system 10 of the present invention. In this embodiment, the support bracket 20 comprises two separate support brackets 46. Each separate support bracket 46 is mounted above the axle 12 and configured to separately support each air spring 18 in the pneumatic suspension system 18. FIG. 16 illustrates the pneumatic suspension system 18 in a deflated position. FIG. 17 illustrates the pneumatic suspension system 18 in an inflated position. Although not illustrated, the pneumatic suspension system 18 may be mounted to the underside of the body 16 and configured to expand downward toward the separate support brackets 46 when inflated.

Although several embodiments have been described in detail for purposes of illustration, various modifications may be made without departing from the scope and spirit of the invention. Accordingly, the invention is not to be limited, except as by the appended claims.

What is claimed is:

1. A composite suspension system for a vehicle, comprising:
   a mechanical suspension system connecting a body of the vehicle to an axle; and
   a pneumatic suspension system moveable between inflated and deflated positions, wherein the pneumatic suspension system extends between and supports the body relative to the axle when inflated, and when deflated does not support the body relative to the axle and is disengaged from one of the body and the axle.

2. The composite suspension system of claim 1, wherein the pneumatic suspension system comprises an air spring suspension.

3. The composite suspension system of claim 1, wherein the mechanical suspension system comprises a leaf spring suspension, a coil spring suspension or a shock absorber.

4. The composite suspension system of claim 1, wherein the pneumatic suspension system is supported by the body or adjacent to the axle.

5. The composite suspension system of claim 1, further comprising a support bracket mounted adjacent to the axle and a pre-determined distance below the body when the body is mounted on the mechanical suspension system.

6. The composite suspension system of claim 5, further comprising support rings on either the upperside of the support bracket or the underside of the body for receiving the pneumatic suspension system when inflated.

7. The composite suspension system of claim 1, further comprising a control system for inflating or deflating the pneumatic suspension system.

8. The composite suspension system of claim 7, wherein the control system comprises an air line attached to the pneumatic suspension system, a first hose connecting the air line to an air compressor and a second hose connecting the air line to a vacuum or negative pressure source having a valve there between.

9. The composite suspension system of claim 8, further comprising a control panel for controlling the compressor and valve.

10. The composite suspension system of claim 8, wherein the pneumatic suspension system is inflated by activating the air compressor and closing the valve, and deflated by turning off the air compressor and opening the valve.

11. The composite suspension system of claim 8, wherein the vacuum or negative pressure source comprises a vehicle engine vacuum source.

12. A composite suspension system for a vehicle, comprising:
   a mechanical suspension system connecting a body of the vehicle to an axle; and
   an air spring suspension system supported by only one of the body or adjacent to the axle and moveable between inflated and deflated positions, wherein the air spring suspension system extends between and supports the body relative to the axle when inflated, and when deflated, does not support the body relative to the axle.

13. The composite suspension system of claim 12, wherein the mechanical suspension system comprises a leaf spring suspension, a coil spring suspension, or a shock absorber.

14. The composite suspension system of claim 12, further comprising a support bracket mounted adjacent to the axle and a pre-determined distance below the body when the body is mounted on the mechanical suspension system.

15. The composite suspension system of claim 14, further comprising support rings on either the upperside of the support bracket or the underside of the body for receiving the air spring suspension system when inflated.

16. The composite suspension system of claim 12, further comprising a control system for inflating or deflating the air spring suspension system.

17. The composite suspension system of claim 16, wherein the control system comprises an air line attached to the pneumatic suspension system, a first hose connecting the air line to an air compressor and a second hose connecting the air line to a vacuum or negative pressure source having a valve therebetween.

18. The composite suspension system of claim 17, further comprising a control panel for controlling the compressor and valve.

19. The composite suspension system of claim 17, wherein the air spring suspension system is inflated by activating the air compressor and closing the valve, and deflated by turning off the air compressor and opening the valve.

20. The composite suspension system of claim 17, wherein the vacuum or negative pressure source comprises a vehicle engine vacuum source.

21. A composite suspension system for a vehicle, comprising:
   a leaf spring, coil spring or shock absorber suspension system connecting a body of the vehicle to an axle;
   a support bracket mounted adjacent to the axle and a pre-determined distance below the body when the body is mounted on the leaf spring suspension or a coil spring suspension system; and
   an air spring suspension system supported by the body or adjacent to the axle and moveable between inflated and deflated positions, wherein the air spring suspension system supports the body relative to the axle when inflated, and does not support the body relative to the axle when deflated.

22. The composite suspension system of claim 21, further comprising support rings on either the upperside of the support bracket or the underside of the body for receiving the air spring suspension system when inflated.

23. The composite suspension system of claim 21, further comprising a control system for inflating or deflating the air spring suspension system.

24. The composite suspension system of claim 23, wherein the control system comprises an air line attached to the pneumatic suspension system, a first hose connecting the air line to an air compressor and a second hose connecting the air line to a vacuum or negative pressure source having a valve therebetween.

25. The composite suspension system of claim 24, further comprising a control panel for controlling the compressor and valve.

26. The composite suspension system of claim 24, wherein the air spring suspension system is inflated by activating the air compressor and closing the valve, and deflated by turning off the air compressor and opening the valve.

27. The composite suspension system of claim 24, wherein the vacuum or negative pressure source comprises a vehicle engine vacuum source.

\* \* \* \* \*